United States Patent [19]
Sato et al.

[11] Patent Number: 5,442,801
[45] Date of Patent: Aug. 15, 1995

[54] ARITHMETIC AND LOGIC UNIT

[75] Inventors: Fumiki Sato; Kouichi Fujita, both of Itami, Japan

[73] Assignee: Mitsubishi Denki Kabushiki Kaisha, Tokyo, Japan

[21] Appl. No.: 147,269

[22] Filed: Nov. 5, 1993

[30] Foreign Application Priority Data

Nov. 5, 1992 [JP] Japan .................. 4-295547

[51] Int. Cl.⁶ .............................. G06F 7/38
[52] U.S. Cl. .................... 395/800; 364/716; 326/52; 326/53
[58] Field of Search ............... 395/800; 364/716, 715; 326/52, 53

[56] References Cited

U.S. PATENT DOCUMENTS

| | | | |
|---|---|---|---|
| 4,349,888 | 9/1982 | Smith | 364/716 |
| 4,435,782 | 3/1984 | Kaufman et al. | 364/716 |
| 4,719,590 | 1/1988 | Aman | 364/768 |
| 5,250,859 | 10/1993 | Kaplinsky | 307/465 |

FOREIGN PATENT DOCUMENTS

1-60856  12/1989  Japan .

*Primary Examiner*—Alyssa H. Bowler
*Assistant Examiner*—Denise Tran
*Attorney, Agent, or Firm*—Lowe, Price, LeBlanc & Becker

[57] ABSTRACT

An arithmetic and logic unit is provided with a first NAND gate (29) which outputs a NAND logic operation result between a first operand ($A_i$), a second operand ($B_i$) and a first control signal ($S_0$), a first EXOR gate (30) which outputs an EXOR logic operation result between the output of the first NAND gate (29) and a second control signal ($S_1$), an OR gate (31) which outputs an OR logic operation result between the first operand ($A_i$) and the second operand ($B_i$), a second NAND gate (32) which outputs a NAND logic operation result between the output of the first EXOR gate (30) and the output of the OR gate (31), a third NAND gate (20) which outputs a NAND logic operation result between a third control signal ($S_2$) and a carry input ($CY_{i-1}$), and a second EXOR gate (21) which outputs an EXOR logic operation result between the output of the second NAND gate (32) and the output of the third NAND gate (20), so that OR, EXOR and AND logic operations and ADD arithmetic operation for the both operands ($A_i$ and $B_i$) are executed.

16 Claims, 6 Drawing Sheets

| FUNCTION | S4 | S3 | S2 | S1 | S0 |
|---|---|---|---|---|---|
| OR | 0 | 1 | 1 | 1 | 0 |
| EXOR | 0 | 0 | 1 | 1 | 0 |
| AND | 0 | 1 | 0 | 1 | 1 |
| ADD | 1 | 1 | 0 | 0 | 1 |

| FUNCTION | S2 | S1 | S0 |
|---|---|---|---|
| OR | 0 | 0 | 0 |
| EXOR | 0 | 0 | 1 |
| AND | 0 | 1 | 1 |
| ADD | 1 | 0 | 1 |

Fig. 5

| Ai | Bi | CYi-1 | Fi | | | |
|----|----|----|----|----|----|----|
| | | | OR | EXOR | AND | ADD |
| 0 | 0 | 0 | 0 | 0 | 0 | 0 |
| 0 | 1 | 0 | 1 | 1 | 0 | 1 |
| 1 | 0 | 0 | 1 | 1 | 0 | 1 |
| 1 | 1 | 0 | 1 | 0 | 1 | 0 |
| 0 | 0 | 1 | 0 | 0 | 0 | 1 |
| 0 | 1 | 1 | 1 | 1 | 0 | 0 |
| 1 | 0 | 1 | 1 | 1 | 0 | 0 |
| 1 | 1 | 1 | 1 | 0 | 1 | 1 |

Fig. 6

ARITHMETIC AND LOGIC UNIT

BACKGROUND OF THE INVENTION

1. Field of the Invention

The present invention relates to an arithmetic and logic unit, particularly to a CMOS static arithmetic and logic unit.

2. Description of Related Art

Figure 1:
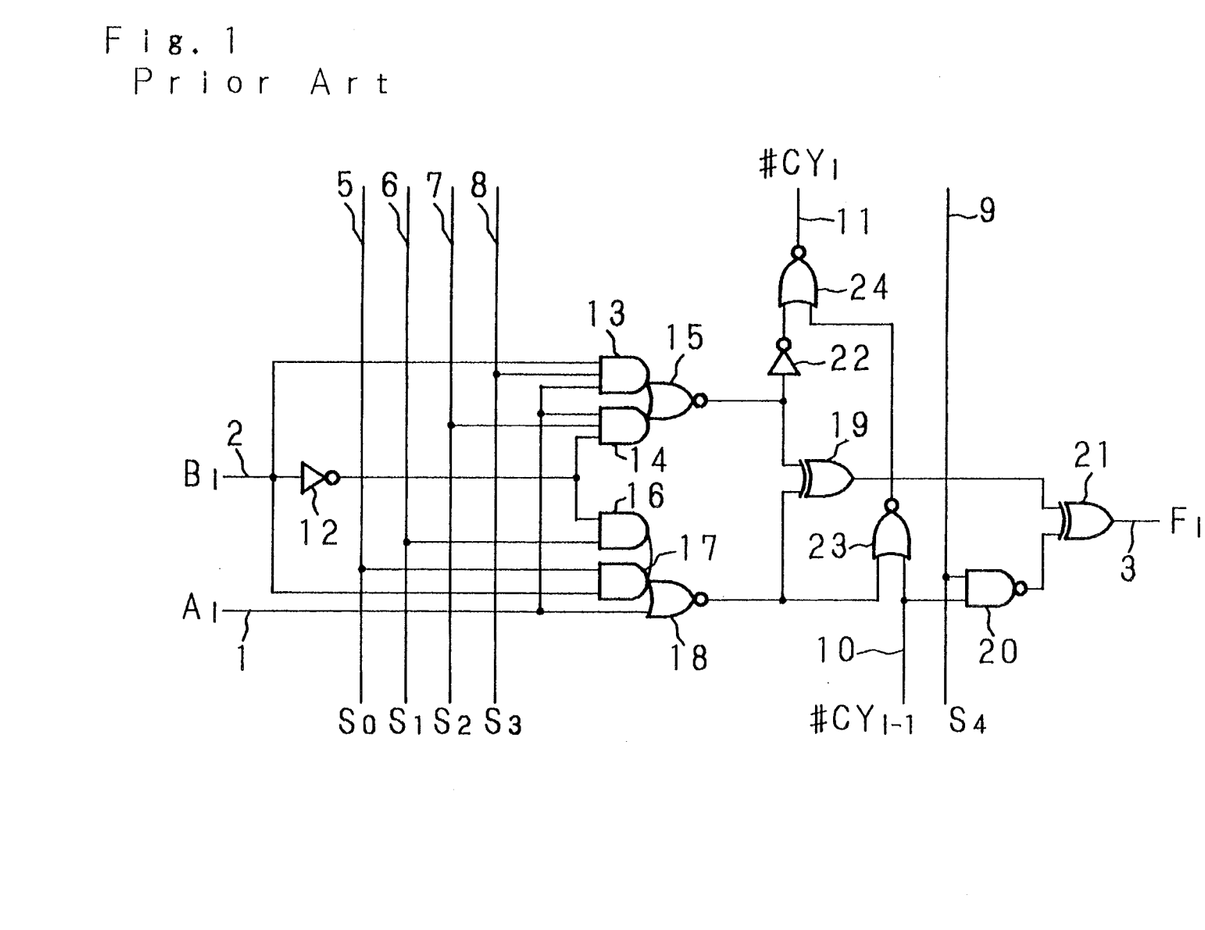
FIG. 1 is a circuit diagram showing a circuit configuration corresponding to one bit of a conventional arithmetic and logic unit.

FIG. 1 is a circuit diagram showing a configuration diagram corresponding to one bit of a conventional arithmetic and logic unit (hereinafter to be called ALU).

In the figure, reference numeral 1 designates a first operand input terminal to which a signal $A_i$ (hereinafter to be called a first operand signal) showing a first operand value ("1" or "0") processed in the conventional ALU is inputted, numeral 2 designates a second operand input terminal to which a signal $B_i$ (hereinafter to be called a second operand signal) showing a second operand value ("1" or "0") is inputted, and numeral 3 designates an output terminal (hereinafter to be called an operation result output terminal) which outputs an operation result signal $F_i$ showing a result of an arithmetic and logic operation of the aforesaid two operands.

Numerals 5 to 9 designate signal lines which respectively gives control ! signal $S_0$, $S_1$, $S_2$, $S_3$ and $S_4$ for designating an arithmetic/logic operation to be operated by the ALU. Numeral 10 designates an input terminal (hereinafter to be called a carry input terminal) of a carry signal $\#CY_{i-1}$ (# designates an inverted signal) outputted from a preceding bit, and numeral 11 designates an output terminal (hereinafter to be called a carry output terminal) of a carry signal $\#CY_i$ given to a following bit.

Accordingly, when a plurality of the one bit ALUs shown in FIG. 1 are used in parallel, the carry input terminal 10 to which the carry signal $\#CY_{i-1}$ is inputted of an adjacent one ALU and the carry output terminal 11 which outputs the carry signal $\#CY_i$ of the adjacent one bit ALU are connected to each other.

Numeral 12 designates an inverter, and the input thereof is connected to the second operand input terminal.

Numeral 13 designates a first AND gate of three inputs, and the first input thereof is connected to the second operand input terminal 2, the second input to the control signal line 8, and the third input to the first operand input terminal 1.

Numeral 14 designates a second AND gate of three inputs, and the first input thereof is connected to the first operand input terminal 1, the second input to the control signal 7, and the third input to the output of the inverter 12.

Numeral 15 designates a first NOR gate of two inputs, and one input thereof is connected to the output of the first AND gate 13, and the other input to the output of the second AND gate 14.

Numeral 16 designates a third AND gate of two inputs, and the one input, thereof is connected to the output of the inverter 12, and the other input to the control signal line 6.

Numeral 17 designates a fourth AND gate of two inputs, and one input thereof is connected to the control signal line 5, and the other input to the second operand input terminal 2.

Numeral 18 designates a second NOR gate of three inputs, and the first input thereof is connected to the output of the third AND gate 16, the second input to the output of the fourth AND gate 17, and the third input to the first operand input terminal 1.

Numeral 19 designates a first exclusive OR gate (hereinafter to be called EXOR gate) of two inputs, and one input thereof is connected to the output of the first NOR gate 15, and the other input to the output of the second NOR gate 18.

Numeral 20 designates a NAND gate of two inputs, and one input thereof is connected to the control signal line 9, and the other input to the carry input terminal 10.

Numeral 21 designates a second EXOR gate of two inputs, and one input thereof is connected to the output of the first EXOR gate 19, and the other input to the output of the first NAND gate 20.

Numeral 22 designates a second inverter, and the output of the first NOR gate 15 is inputted to the input thereof.

Numeral 23 designates a third NOR gate of two inputs, and one input thereof is connected to the output of the second NOR gate 18, and the other input to the carry input terminal 10.

Numeral 24 designates a fourth NOR gate of two inputs, and the first input thereof is connected to the output of the second inverter 22, and the second input to the output of the third NOR gate 23, and the output is connected to the carry output terminal 11. In other words, the output of the fourth NOR gate 24 becomes the carry signal $\#CY_i$ given to the following bit.

In the conventional one bit ALU shown in FIG. 1, an arithmetic/logic operation, to be executed responsive to the combination of the control signals $S_0$, $S_1$, $S_2$, $S_3$ and $S_4$ inputted to the control signal lines 5 to 9, is decided.

Figure 2:
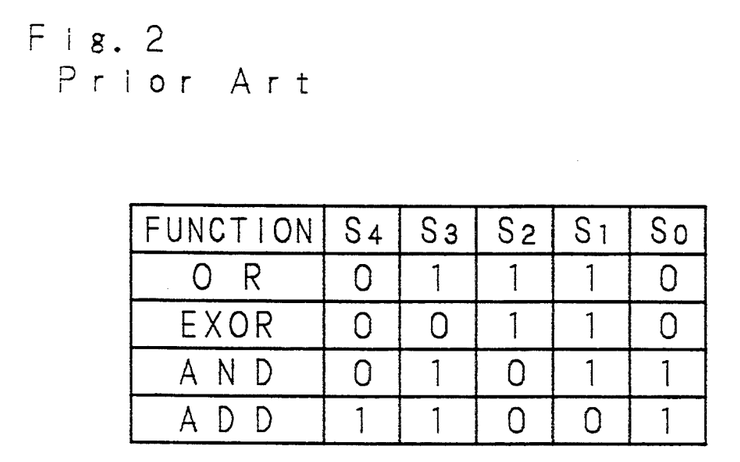
FIG. 2 is a table showing a relation between arithmetic/logic operations executed by a conventional arithmetic and logic unit and signals inputted to respective control signal lines.

FIG. 2 is a table showing a relation between the arithmetic/logic operation executed by the conventional one bit ALU and signals inputted to the respective control signal lines 5 to 9.

For example, when logic operation "OR" is executed, , "0, 1, 1, 1, 0" as the control signals $S_4$, $S_3$, $S_2$, $S_1$, $S_0$ are inputted respectively to the control signals 9 to 5, as shown in FIG. 2. When logic operation "EXOR", logic operation "AND", and arithmetic operation ADD are executed respectively, "0, 0, 1, 1, 0", "0, 1, 0, 1, 1", "1, 1, 0, 0, 1" as the control signals $S_4$, $S_3$, $S_2$, $S_1$, $S_0$ respectively inputted to the control signal lines 9 to 5 are inputted respectively.

Next, concrete explanation will be made on the operation of the conventional ALU having such a configuration as aforementioned.

At first, explanation will be made on the case where logic operation "OR" is executed.

In this case, the fact, that "0, 1, 1, 1, 0" as the control signals $S_4$, $S_3$, $S_2$, $S_1$, $S_0$ inputted respectively to the control signal lines 9 to 5 are inputted, is as shown in FIG. 2. Here, explanation will be made on the case where the first operand signal $A_i$ inputted to the first operand input terminal 1 is "1" and the case where the signal is "0".

When "1" is inputted as the first operand signal $A_i$ to the first operand input terminal 1, the second NOR gate 18 outputs "0". Since "1" is inputted as the control signal $S_2$, $S_3$ to both of the control signal lines 7, 8, and "1" is inputted to the first operand input terminal, all of the inputs of either the first AND gate 13 or the second AND gate become "1" irrespective of the value of the second operand signal $B_i$ inputted to the second operand input terminal 2, and the output thereof becomes "1".

Thereby, the output of the first NOR gate 15 becomes "0".

Accordingly, the first EXOR gate 19 inputs the output "0" of the first NOR gate 15 and the output "0" of the second NOR gate 18 to output "0". On the other hand, since "0" is inputted as the control signal $S_4$ to the control signal line 9, the first NAND gate 20 outputs "1". Since the second EXOR gate 21 inputs the output "0" of the first EXOR gate 19 and the output "1" of the first NAND gate 20 to output "1", "1" is outputted as an operation result signal $F_i$ from the operation result output terminal 3.

When "0" is inputted as the first operand signal $A_i$ to the first operand input terminal 4, both the first AND gate 13 and the second AND gate 14 output "0". Thereby, the first NOR gate 15 outputs "1". Since "0" is inputted as the control signal $S_0$ to the control signal line 5, the fourth AND gate 17 always outputs "0". Since one input of the third AND gate 16 is connected to the first inverter 12, the third AND gate 16 outputs "0" when the second operand signal $B_i$ inputted to the second operand input terminal 2 is "1" (explanation will be made later on the case where the second operand signal $B_i$ is "0").

Accordingly, since all of the three inputs of the second NOR gate 18 become "0" the output thereof becomes "1" The fact, that the first EXOR gate 19 inputs the output "1" of the first NOR gate 15 and the output "1" of the second NOR gate 18 to output "0" and thereafter "1" is outputted as the operation result output signal $F_i$ from the operation result output terminal 3, is same as in the case where the aforesaid first operand signal $A_i$ is "1".

When the second operand signal $B_i$ inputted to the second operand input terminal 2 is "0", the first inverter 12 outputs "1", and after inputting it, the third AND gate 16 outputs "1". The second NOR gate 18 inputs the output "1" of the third AND gate 16 to output "0". Thereby, since one input of the first EXOR gate 19 becomes "1" and the other input becomes "0" the first EXOR gate 19 outputs "1". At this time, since the output of the first NAND gate 20 becomes "1" the second EXOR gate 21 outputs "0" thereby, "0" is outputted as the operation result signal $F_i$ from the operation result output terminal 3.

When logic operation "EXOR" is executed, "0, 0, 1, 1, 0" are inputted as the control signals $S_4$, $S_3$, $S_{2, 1}$, $S_0$ respectively to the control signal lines 9 to 5.

At first, explanation will be given on the case where "0" is inputted as the first operand signal $A_i$ to the first operand input terminal 1 and "0" is inputted as the second operand signal $B_i$ to the second operand input terminal 2.

Since the control signal $S_3$ being inputted to the control signal line 8 is "0" the first AND gate 13 outputs "0". Since the first operand signal $A_i$ being inputted to the first operand input terminal 1 is "0", the second AND gate 14 outputs "0". Thereby, both the two inputs of the first NOR gate 15 become "0" the NOR gate 15 outputs "1" Since the second operand signal $B_i$ inputted to the second operand input terminal 2 is "0", the inverter 12 outputs "1".

Accordingly, the third AND gate 16 inputs the output "1" of the inverter 12 and the signal "1" of the control signal line 6 to output "1". The second NOR gate 18 inputs this output to output "0". The first EXOR gate 19 inputs the output "1" of the NOR gate 15 and the output "0" of the NOR gate 18 to output "1". Since the output of the first EXOR gate 19 is inverted by the second EXOR gate 21, "0" is outputted as the operation result signal $F_i$ from the operation result output terminal 3.

Next, explanation will be given on the case where "1" is inputted as the first operand signal $A_i$ to the first operand input terminal 1 and "0" is inputted as the second operand signal $B_i$ to the second operand input terminal 2.

Since the control signal $S_3$ being inputted to the control signal line 8 is "0", the first AND gate 13 outputs "0". Since the input of the inverter 12 is connected to the second operand input terminal 2, the inverter 12 outputs "1". Thereby, all of the three inputs of the second AND gate 14, that is, the outputs of the first operand input terminal 1, the control signal line 7 and the inverter 12 become "1", and the second AND gate 14 outputs "1". By inputting the output, the first NOR gate 15 outputs "0".

The second NOR gate 18 inputs signal "1" from the first operand input terminal 1 to output "0". The first EXOR gate 19 inputs the output "0" of the first NOR gate 15 and the output "0" of the second NOR gate 18 to output "0". Since the output of the first EXOR gate 19 is inverted by the second EXOR gate 21, "1" is outputted as the operation result signal $F_i$ from the operation result output terminal 3.

Next explanation will be given on the case where "0" is inputted as the first operand signal $A_i$ to the first operand input terminal 1 and "1" is inputted as the second operand signal $B_i$ to the second operand input terminal 2.

Since the control signal $S_3$ being inputted to the control signal line 8 is "0", the first AND gate 13 outputs "0". The second AND gate 14 inputs signal "0" from the first operand input terminal 1 to output "0". Accordingly, since both of the two inputs of the first NOR gate 15 become "0", the NOR gate 15 outputs "1". Since the input of the inverter 12 is connected to the second operand input terminal 2, the inverter 12 outputs "0". The third AND gate 16 inputs the output of the inverter 12 to output "0". Since the control signal $S_0$ being inputted to the control signal line 5 is "0", the fourth AND gate 17 outputs "0".

Accordingly, all of the three inputs of the second NOR gate 18, that is, the output of the third AND gate 16, the output of the fourth AND gate 17 and the first operand input terminal 1 become "0", and the second NOR gate 18 outputs "1". The first EXOR gate 19 inputs the output "1" of the first NOR gate 15 and the output "1" of the second NOR gate 18 to output "0". Since the output of the first EXOR gate 19 is inverted by the second EXOR gate 21, "1" is outputted as the operation result signal $F_i$ from the operation result output terminal 3.

At last, explanation will be given on the case where "1" is inputted as the first operand signal $A_i$ to the first operand input terminal 1 and "1" is inputted as the second operand signal $B_i$ to the second operand input terminal 2.

Since the control signal $S_3$ being inputted to the control signal line 8 is "0", the first AND gate 13 outputs "0". Since the input of the inverter 12 is connected to the second operand input terminal 2, the inverter 12 outputs "0". By inputting the output of the inverter 12, the second AND gate 14 outputs "0". Thereby, both of the two inputs of the first NOR gate 15 become "0", and the first NOR gate outputs "1". The third AND gate 16 inputs the output "0" of the inverter 12 and outputs "0". The second NOR gate 18 inputs the output of the third AND gate 16 and outputs "0". The first EXOR gate 19 inputs the output "1" of the first NOR gate 15 and the output "0" of the second NOR gate 18 and outputs "1". Since the output of the first EXOR gate 19 is inverted by the second EXOR gate 21, "0" is outputted as the operation result signal $F_i$ from the operation result output terminal 3.

When logic operation "AND" is executed, "0, 1, 0, 1, 1" are inputted as the control signals $S_4, S_3, S_2, S_1, S_0$ respectively to the control signal lines 9 to 5.

At this time, since the control signal $S_2$ having been inputted to the control signal line 7 is "0", the second AND gate 14 always outputs "0". To the one input of the fourth AND gate 17 and to the one input of the third AND gate 16, the second operand signal $B_i$ inputted to the second operand input terminal 2 and a signal obtained by inverting the second operand signal $B_i$ are inputted respectively. To the other input of the fourth AND gate 17 and to the other input of the third AND gate 16, since the control signals $S_0, S_1$ inputted to the control signal lines 5, 6 which are both "1" are being inputted, either the output of the fourth AND gate 17 or the output of the third AND gate 16 becomes "1".

Accordingly, the second NOR gate 18 always outputs "0". On that assumption, explanation will be made on the respective combinations of signals inputted to the first operand input terminal 1 and to the second operand input terminal 2.

At first, explanation will be made on the case where "0" is inputted as the first operand signal $A_i$ to the first operand input terminal 1, and "0" is inputted as the second operand signal $B_i$ to the second operand input terminal 2.

The first AND gate 13 inputs "0" as the first operand signal $A_i$ from the first operand input terminal 1 to output "0". The first NOR gate 15 inputs the output "0" of the first AND gate 13 and the output "0" of the second AND gate 14 to output "1". The first EXOR gate 19 inputs the output "1" of the first NOR gate 15 and the output "0" of the second NOR gate 18 to output "1". Since the output of the first EXOR gate 19 is inverted by the second EXOR gate 21, "0" is outputted as the operation result signal $F_i$ from the operation result output terminal 3.

Next, explanation will be given on the case where "1" is inputted to the first operand input terminal 1 and "0" is inputted to the second operand input terminal 2.

The first AND gate 13 inputs a signal "0" having been inputted to the second operand input terminal 2 to output "0". The first NOR gate 15 inputs the output "0" of the AND gate 13 and the output "0" of the second AND gate 14 to output "1". The first EXOR gate 19 inputs the output "1" of the first NOR gate 15 and the output "0" of the second NOR gate 18 to output "1". Since the output of the first EXOR gate 19 is inverted by the second EXOR gate 21, "0" is outputted from the operation result output terminal 3.

Next, explanation will be given on the case where "0" is inputted as the first operand signal $A_i$ to the first operand input terminal 1 and "1" is inputted as the second operand signal $B_i$ to the second operand input terminal 2.

The first AND gate 13 inputs "0" as the first operand signal $A_i$ from the first operand input terminal 1 to output "0". The first NOR gate 15 inputs the output "0" of the first AND gate 13 and the output "0" of the second AND gate 14 to output "1". The first EXOR gate 19 inputs the output "1" of the first NOR gate 15 and the output "0" of the second NOR gate 18 to output "1". Since the output of the first EXOR gate 19 is inverted by the second EXOR gate 21, "0" is outputted as the operation result signal $F_i$ from the operation result output terminal 3.

At last, explanation will be given on the case where "1" is inputted as the first operand signal $A_i$ to the first operand input terminal 1 and "1" is inputted as the second operand signal $B_i$ to the second operand input terminal 2.

Since both of the first operand signal $A_i$ inputted to the first operand input terminal 1 and the second operand signal $B_i$ inputted to the second operand input terminal 2 are "1", and the control signal $S_2$ inputted to the control signal line 8 is "1", the first AND gate 13 outputs "1". After inputting the output of the first AND gate 13, the first NOR gate 15 outputs "0". The first EXOR gate 19 inputs the output "0" of the first NOR gate 15 and the output "0" of the second NOR gate 18 to output "0". Since the output of the first EXOR gate 19 is inverted by the second EXOR gate 21, "1" is outputted as the operation result signal $F_i$ from the operation result output terminal 3.

When arithmetic operation "ADD" is executed, "1, 1, 0, 1" are inputted as the control signal $S_4, S_3, S_2, S_1, S_0$ inputted to the control signal lines 9 to 5.

At this time, the second AND gate 14 inputs "0" as the control signal $S_2$ from the control signal line 7 to always output "0", and the third AND gate 16 inputs "0" as the control signal $S_1$ from the control signal line 6 to always output "0". Since the control signal $S_4$ inputted to the control signal line 9 is "1", the first NAND gate 20 inverts the carry signal $\#CY_{i-1}$ from the preceding bit inputted from the carry input terminal 10 to output it to the second EXOR gate 21.

Accordingly, when the carry signal $\#CY_{i-1}$ from the preceding bit is "0", the second EXOR gate 21 inverts the output of the first EXOR gate 19 to output it as the operation result signal $F_i$ from the operation result output terminal 3, and when the carry signal $\#CY_{i-1}$ from the preceding bit is "1", the second EXOR gate 21 outputs the output of the first EXOR gate 19 intact as the operation result signal $F_i$ from the operation result output terminal 3. On that assumption, the explanation will be given on the combination of the first operand signal $A_i$ and the second operand signal $B_i$ respectively inputted to the first operand input terminal 1 and the second operand input terminal 2.

At first, explanation will be given on the case where "0" is inputted as the first operand signal $A_i$ to the first operand input terminal 1 and "0" is inputted as the second operand signal $B_i$ to the second operand input terminal 2.

The first AND gate 13 inputs "0" from the first operand input terminal 1 as the first operand signal $A_i$ to output "0". Thereby, the first NOR gate 15 inputs the output "0" of the first AND gate 13 and the output "0" of the second AND gate 14 to output "1". The fourth AND gate 17 inputs a signal "0" of the second operand input terminal 2 to output "0". Thereby, since all of the three inputs of the second NOR gate 18, that is, the output of the third AND gate 16, the output of the fourth AND gate 17 and the signal of the first operand input terminal 1 become "0", the second NOR gate 18 outputs "1". The first EXOR gate 19 inputs the output "1" of the first NOR gate 15 and the output "1" of the second NOR gate 18 to output "0".

At this time, when the carry signal $\#CY_{i-1}$ from the preceding bit inputted from the carry input terminal 10 is "0", the second EXOR gate 21 inverts the output "0" of the first EXOR gate 19 and outputs "1" from the operation result output terminal 3 as the operation result signal $F_i$. On the contrary, when the carry signal $\#CY_{i-1}$ from the preceding bit inputted to the carry input terminal 10 is "1", the second EXOR gate 21 outputs intact the output "0" of the first EXOR gate 19 from the operation result output terminal 3 as the operation result signal $F_i$.

When the carry signal $\#CY_{i-1}$ is "1", the second inverter 22 inputs the output, "1" of the first NOR gate 15 and outputs "0" obtained by inverting the output "1" of the first NOR gate 15 to the fourth NOR gate 24. The third NOR gate 23 inputs the output "1" of the second NOR gate 18 to output "0" to the fourth NOR gate 24. Accordingly, since both of the two inputs of the fourth NOR gate 24 become "0", "1" is outputted from the carry signal output terminal 11 as the carry signal $\#CY_i$ given to the following bit.

Next, explanation will be given on the case where "1" is inputted as the first operand signal $A_i$ to the first operand input terminal 1 and "0" is inputted as the second operand signal $B_i$ to the second operand input terminal 2.

The first AND gate 13 inputs "0" from the second operand input terminal 2 as the second operand signal $B_i$ to output "0". The first NOR, gate 15 inputs the output "0" of the first AND gate 13 and the output "0" of the second AND gate 14 to output "1". The second NOR gate 18 inputs "1" from the first operand input terminal 1 as the first operand signal $A_i$ to output "0". Accordingly, the first EXOR gate 19 inputs the output "1" of the first NOR gate 15 and the output "0" of the second NOR gate 18 to output "1".

At this time, when the carry signal $\#CY_{i-1}$ from the preceding bit inputted from the carry input terminal 10 is "0", the second EXOR gate 21 inverts the output "1" of the first EXOR gate 19 to output "0" from the operation result output terminal 3 as the operation result signal $F_i$. On the contrary, when the carry signal $\#CY_{i-1}$ from the preceding bit inputted from the carry input terminal 10 is "1", the second EXOR gate 21 outputs intact the output "1" of the first EXOR gate 19 from the operation result output terminal 3 as the operation result signal $F_i$.

The second inverter 22 inputs and inverts the output "1" of the first NOR gate 15 to output "0" to the fourth NOR gate 24. On the other hand, the output of the second NOR gate 18 is "0", the third NOR gate 23 inverts the carry signal $\#CY_{i-1}$ from the preceding bit inputted from the carry input terminal 10 to output it to the fourth NOR gate 24. Accordingly, the carry signal $\#CY_{i-1}$ from the preceding bit inputted from the carry input terminal 10 is "1", since both of the two inputs of the fourth NOR gate 24 become "0", the fourth NOR gate 24 outputs "1" from the carry output terminal 11 as the carry signal $\#CY_i$ given to the following bit. On the contrary, when the carry signal $\#CY_{i-1}$ from the preceding bit inputted from the carry input terminal 10 is "0", the third NOR gate 23 outputs "1" to the fourth NOR gate 24. The fourth NOR gate 24 inputs the output of the third NOR gate 23 and outputs "0" from the carry output terminal 11 as the carry signal $\#CY_i$ given to the following bit.

Next, explanation will be given on the case where "0" is inputted as the first operand signal $A_i$ to the first operand input terminal 1, and "1" is inputted as the second operand signal $B_i$ to the second operand input terminal 2.

The first AND gate 13 inputs "0" from the first operand input terminal 1 as the first operand signal $A_i$ to output "0". The first NOR gate 15 inputs the output "0" of the first AND gate 13 and the output "0" of the second AND gate 14 to output "1". The fourth AND gate 17 inputs "1" as the second operand signal $B_i$ from the second operand input terminal 2 and "1" as the control signal $S_0$ from the control signal line 5 to output "1". The second NOR gate 18 inputs the output of the fourth AND gate 17 to output "0".

Therefore, the first EXOR gate 19 inputs the output "1" of the first NOR gate 15 and the output "0" of the second NOR gate 18 to output "1".

Explanation on the operation after this will be omitted because it is same as that of the case where "1" is inputted as the first operand signal $A_i$ the first operand input terminal 1 and "0" is inputted as the second operand signal $B_i$ to the second input terminal 2.

At last, explanation will be made on the case where "1" is inputted as the first operand signal $A_i$ to the first operand input terminal 1 and "1" is inputted as the second operand signal $B_i$ to the second operand input terminal 2.

The first AND gate 13 inputs "1" as the first operand signal $A_i$ from the first operand input terminal 1, "1" as the second operand signal $B_i$ from the second operand input terminal 2 and "1" as the control signal $S_2$ from the control signal line 8 respectively to output "1". The first NOR gate 15 inputs the output of the first AND gate 13 to output "0". The second NOR gate 18 inputs "1" from the first operand input terminal 1 as the first operand signal $A_i$ to output "0".

Accordingly, the first EXOR gate 19 inputs the output "0" of the first NOR gate 15 and the output "0" of the second NOR gate 18 to output "0".

At this time, when the carry signal $\#CY_{i-1}$ from the preceding bit inputted from the carry input terminal 10 is "0", the second EXOR gate 21 inverts the output "0" of the EXOR gate 19 and outputs "1" from the operation result output terminal 3 as the operation result signal $F_i$. On the contrary, when the carry signal $\#CY_{i-1}$ from the preceding bit inputted from the carry input terminal 10 is "1", the second EXOR gate 21 outputs intact the output "0" of the first EXOR gate 19 from the operation result output terminal 3 as the operation result signal $F_i$.

The second inverter 22 inputs and inverts the output "0" of the first NOR gate 15 and outputs "1" to the fourth NOR gate 24. The fourth NOR gate 24 inputs the output of the second inverter 22 and outputs "0" from the carry output terminal 11 as the carry signal $\#CY_i$ given to the following bit.

By the way, the conventional one bit ALU shown in FIG. 1 is composed of about 50 transistors. But, when microcomputer is configured as an LSI obtained by integrating circuits on one chip, it is expected that the number of transistors used as ALU is made as small as possible so that ALU does not occupy the substrate area excessively. It has become an important point when such circumstances is taken into consideration that a microcomputer is made to have a sophisticated function sequentially from 8 bits to 16 bits, and to 32 bits recently.

And the conventional ALU cannot drive a data bus because the driving ability of the EXOR gate of itself is low, and a bus driver is required for outputting an operation result data to a data bus.

SUMMARY OF THE INVENTION

The present invention has been devised in consideration of such circumstances as aforementioned, and the primary object thereof is to provide an arithmetic and logic unit in which the number of transistors required for configuring the unit is reduced.

The second object of the present invention is to provide an arithmetic and logic unit being provided with a temporary storing circuit of arithmetic/logic operation result capable of driving a data bus.

The arithmetic and logic unit is provided with a first NAND gate which outputs a NAND logic operation result between a first operand, a second operand and a first control signal, a first EXOR gate which outputs an EXOR logic operation result between the output of the first NAND gate and a second control signal, an OR gate which outputs an OR logic operation result between the first operand and the second operand, a second NAND gate which outputs a NAND logic operation result between the output of the first EXOR gate and the output of the OR gate, a third NAND gate which outputs a NAND logic operation result between a third control signal and a carry input, and a second EXOR gate which outputs an EXOR logic operation result between the output of the second NAND gate and the output of the third NAND gate.

And the arithmetic and logic unit related to the invention is further provided with a carry generating unit which generates a carry output signal of a carry signal from the output of the first NAND gate, the output of the second NAND gate and the carry input signal of a carry signal.

The arithmetic anti logic unit related to the present invention is more further provided with a temporary storing circuit which is composed of two NOT gates each of whose output is connected with the others input and vice versa, and temporarily stores an output of an operation result.

In the arithmetic and logic unit related to the invention, logic or arithmetic operation such as "OR", "EXOR", "AND" and "ADD" are executed according to the combination of control signals respectively inputted to the control signal lines against the operands inputted to the two operand input terminals, and outputs a signal representing that result from the operation result output terminal.

In the arithmetic and logic unit related to the invention, a carry output signal of a carry signal is generated from an intermediate result of operation and a carry input signal of a carry signal.

And in arithmetic and logic unit related to the invention, an output of an operation result is stored in a temporary storing circuit temporarily, and the fact enables to drive a data bus.

The above and further objects and features of the invention will more fully be apparent from the following detailed description with accompanying drawings.

DESCRIPTION OF THE PREFERRED EMBODIMENTS

In the following, description will be made on the present invention referring to the drawings of the embodiments thereof.

Figure 3:
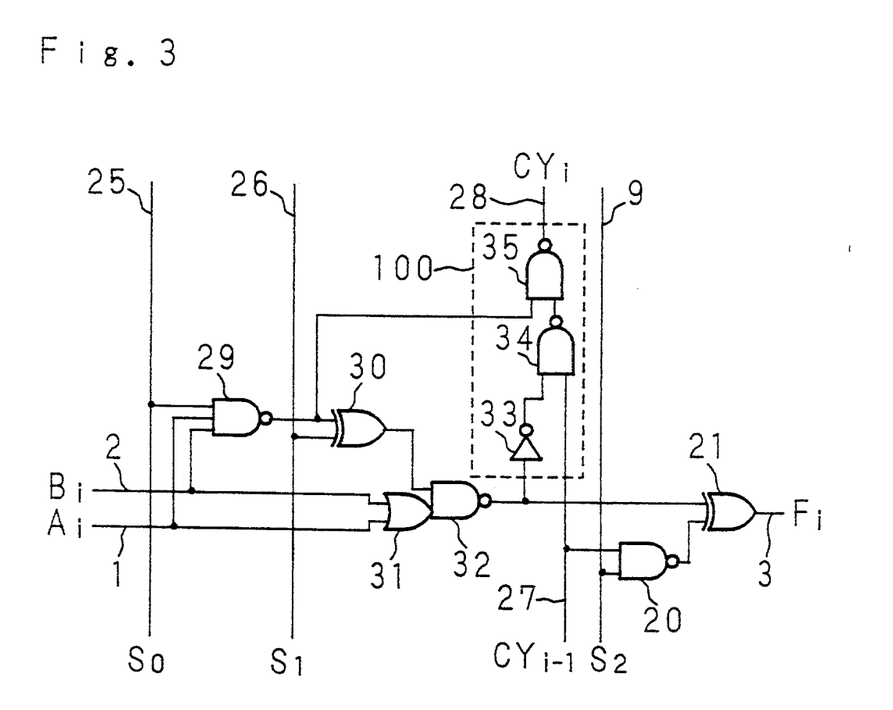
FIG. 3 is a circuit diagram for one bit showing a configuration of a first embodiment of an arithmetic and logic unit related to the invention.

FIG. 3 is a circuit diagram for one bit showing a configuration of the first embodiment of the arithmetic and logic unit related to the invention. In addition, it is also possible for a plurality of the arithmetic and logic units (hereinafter to be called ALU) in parallel in the same way as the conventional example.

In FIG. 3, reference numeral 1 designates an input terminal (hereinafter to be called a first operand input terminal) of a first operand signal $A_i$ processed in the ALU of the present invention, 2 designates an input terminal (hereinafter to be called a second operand input terminal) of a second operand signal $B_i$ processed in the same, and 3 designates an output terminal (hereinafter to be called an operation result output terminal) of an operation result signal $F_i$.

Numerals 9, 26, 25 designate respectively a third, a second, and a first control signal lines for inputting respective control signals ($S_2$, $S_1$, $S_0$) for indicating arithmetic/logic operation to be executed by the ALU of the invention.

Numeral 27 designates an input terminal (hereinafter to be called a carry input terminal) of a carry signal $CY_{i-1}$ given from a preceding bit, and numeral 28 designates an output terminal (hereinafter to be called a carry output terminal) of a carry signal $CY_i$ given to a following bit.

Accordingly, when the one bit ALU circuits of the present invention are used in parallel, it is proper to connect the carry input terminal 27 to which the carry signal $CY_{i-1}$ of the adjacent one bit ALU is inputted with the carry output terminal 28 which outputs the carry signal $CY_i$.

Numeral 29 designates a first NAND gate of three inputs, and the first input thereof is connected to the first operand input terminal 1, the second input to the second operand input terminal 2, and the third input to the first control signal line 25.

Numeral 30 designates a first EXOR gate of two inputs, and one input thereof is connected to the output of the first NAND gate 29 and the other input to the second control signal line 26.

Numeral 31 designates an OR gate of two inputs, and one input thereof is connected to the first operand input terminal 1, and the other input to the second operand input terminal 2.

Numeral 32 designates a second NAND gate of two inputs, and one inputs thereof is connected to the output of the first EXOR gate 30, and the other input to the output of the OR gate 31.

Numeral 20 designates a third NAND gate of two inputs, and one input thereof is connected to the third control signal line 9 and the other input to the carry input terminal 27 given from a preceding bit.

Numeral 21 designates a second EXOR gate of two inputs, and one input thereof is connected to the output of the second NAND gate 32, and the other input to the output of the third NAND gate 20, and the output is connected to the operation result output terminal 3.

Numeral 33 designates an inverter, and the input thereof is connected to the output of the second NAND gate 32.

Numeral 34 designates a fourth NAND gate of two inputs, and one input thereof is connected to the output of the inverter 33, and the other input to the carry input terminal 27 given from a preceding bit.

Numeral 35 designates a fifth NAND gate of two inputs, and one input thereof is connected to the output of the first NAND gate 29, and the other input to the output of the fourth NAND gate 34, and the output is connected to the carry output terminal 28 given to the following bit.

In addition, the inverter 33, the fourth NAND gate 34 and the fifth NAND gate 35 constitutes a carry generating circuit 100.

In the ALU of the invention, an arithmetic/logic operation to be executed is decided by inputting signals respectively to the control signal lines 25, 26, 9.

Figure 4:
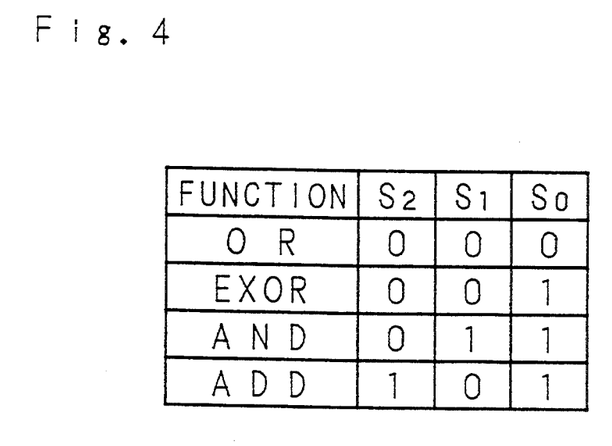
FIG. 4 is a table showing a relation between an arithmetic/logic operations executed by an arithmetic and logic unit related to the invention and combinations of control signals inputted respectively to control signal lines.

FIG. 4 is a table showing a relation between arithmetic/logic operations executed by the ALU of the invention and combinations of the respective control signals $S_2$, $S_0$, $S_1$ respectively inputted to the control signal lines 9, 26, 25. For example, when a logic operation "OR" is executed, "0, 0, 0" are inputted as the control signals $S_2$, $S_1$, $S_0$ respectively to the control signal lines 9, 26, 25. And when a logic operation "EXOR", a logic operation "AND" and an arithmetic operation "ADD" are executed respectively, "0, 0, 1", "0, 1, 1", "1, 0, 1" are inputted as shown in FIG. 4 respectively as the control signals $S_2$, $S_1$, $S_0$ inputted to the control signal lines 9, 26, 25.

Next, concrete explanation will be given on the operation of the ALU of the invention.

Figure 5:
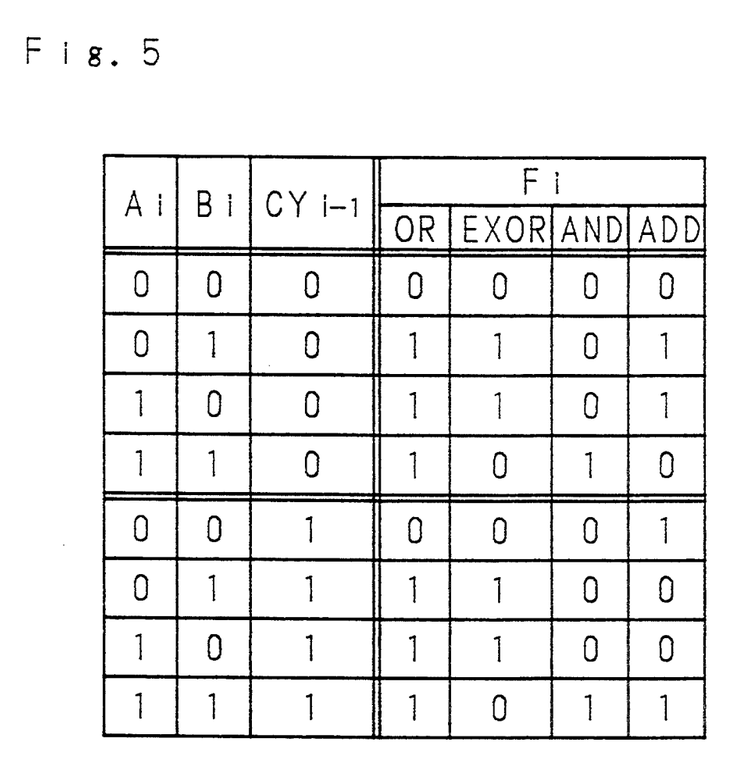
FIG. 5 is a schematic diagram showing a truth value table between respective operand signals of arithmetic/logic operation executed by an arithmetic and logic unit related to the invention, carry inputs of carry signals, and operation result signals.

In addition, FIG. 5 is a schematic diagram showing a truth value table between the respective operand signals $A_i$, $B_i$, the carry input signal $CY_{i-1}$, and the operation result signal $F_i$ at the time when the operations "OR", "EXOR", "AND" and "ADD" executed by the ALU of the invention are executed.

At first, explanation will be given on the case where the logic operation "OR" is executed.

The fact that "0, 0, 0" are inputted as the control signals $S_2$, $S_1$, $S_0$ inputted respectively to the control signal lines 25, 26, 9 is described above. In this case, since the control signal $S_0$ inputted to the first control signal line 25 is "0", the first NAND gate 29 always outputs "1". The first EXOR gate 30 inputs the output "1" of this first NAND gate 29 and "0" as the control signal $S_1$ being inputted to the second control signal line 26, and always outputs "1". On that assumption, explanation will be made on the respective combinations of the first operand signal $A_i$ and the second operand signal $B_i$ inputted respectively to the first operand input terminal 1 and the second operand input terminal 2.

At first, explanation will be given on the case where "0" is inputted as the first operand signal $A_i$ to the first operand input terminal 1 and "0" is inputted as the second operand signal $B_i$ to the second operand input terminal 2.

In this case, since the signal of the first operand input terminal 1 is "0" and the signal of the second operand input terminal 2 is "0", the OR gate 31 outputs "0". Since the output of the first EXOR gate 30 is "1", the second NAND gate 32 inverts the output of the OR gate 31 and outputs "1" to the second EXOR gate 21. Since the signal of the third control signal line 9 is "0", the third NAND gate 20 always outputs "1" to the second EXOR gate 21. After inputting the output of the third NAND gate 20, the second EXOR gate 21 inverts the output of the second NAND gate 32 and outputs "0" to the operation result output terminal 3.

Next, explanation will be given on the case where "1" is inputted as the first operand signal $A_i$ to the first operand input terminal 1, and "0" is inputted as the second operand signal $B_i$ to the second operand input terminal 2.

In this case, since the signal of the first operand input terminal 1 is "1", and the signal of the operand input terminal 2 is "0", the OR gate 31 outputs "1". Since the output of the first EXOR gate 30 is "1", the second NAND gate 32 inverts the output of the OR gate 31 and outputs "0" to the second EXOR gate 21. Since the signal of the third control signal 9 is "0", the third NAND gate 20 always outputs "1" to the second EXOR gate 21. After inputting the output of the third NAND gate 20, the second EXOR gate 21 inverts the output of the second NAND gate 32 and outputs "1" to the operation result output terminal 3.

Explanation will be omitted on the case where "1" is inputted to the first operand input terminal 1 and "0" is inputted to the second operand input terminal 2, or the case where "1" is inputted to the first operand input terminal 1 and "1" is inputted to the second operand input terminal 2, because the output of the OR gate 31 becomes the same as in the case abovementioned.

In such a way as abovementioned, the logic operation "OR" is realized.

Next, explanation will be given on the logic operation "EXOR".

When the logic operation "EXOR" is executed, "0, 0, 1" are inputted as the control signals $S_2$, $S_1$, $S_0$ inputted respectively to the control signal lines 25, 26, 9.

On the assumption that the first EXOR gate 30 outputs intact the output of the first NAND gate 29 and the second EXOR gate 21 outputs the output of the second NAND gate 32 after inverting it, explanation will be given in the following on the respective combinations of the first operand signals $A_i$ and the second operand signals $B_i$ inputted respectively to the first operand input terminal 1 and the second operand input terminal 2.

At first, explanation will be given on the case where "0" is inputted as the first operand signal $A_i$ to the first operand input terminal 1 and "0" is inputted as the second operand signal $B_i$ to the second operand input terminal 2.

In this case, the OR gate 31 outputs "0". The second NAND gate 32 inputs the output of the OR gate 31 and outputs "1" to the second EXOR gate 21. Since the second EXOR gate 21 inverts the output of the second NAND gate 32 and outputs "0", this output "0" is outputted as the operation result signal $F_i$ from the operation result output terminal 3.

Next, explanation will be made on the case where "1" is inputted as the first operand signal $A_i$ to the first operand input terminal 1 and "0" is inputted as the second operand signal $B_i$ to the second operand input terminal 2.

The first NAND gate 29 inputs "0" as the second operand signal $B_i$ from the second operand input terminal 2 and outputs "1". The first EXOR gate 30 outputs intact the output "1" of the first NAND gate 29. On the other hand, the OR gate 31 inputs "1" as the first operand signal $A_i$ from the first operand input terminal 1 and outputs "1". Accordingly, both of the two inputs of the second NAND gate 32 become "1" and the NAND gate 32 outputs "0" to the second EXOR gate 21. The second EXOR gate 21 inputs the output of the second NAND gate 32 and inverts it to output "1", and this output is outputted as the operation result signal $F_i$ from the operation result output terminal 3.

Explanation will be omitted on the case where "0" is inputted as the first operand signal $A_i$ to the first operand input terminal 1 and "1" is inputted as the second operand signal $B_i$ to the second operand input terminal 2, because both of the outputs of the first NAND gate 29 and the OR gate 31 become the same as in the above-mentioned case.

At last, explanation will be given on the case where "1" is inputted as the first operand signal $A_i$ to the first operand input terminal and "1" is inputted as the second operand signal $B_i$ to the second operand input terminal 2.

In this case, all of the three inputs of the first NAND gate 29 become "1" and the first NAND gate 29 outputs "0", and the first EXOR gate 30 outputs intact the output "0" of the first NAND gate 29. The second NAND gate 32 inputs the output of the first EXOR gate 30 and outputs "1" to the second EXOR gate 21. The second EXOR gate 21 inverts the output of the second NAND gate 32 and outputs "0", and this output "0" is outputted as the operation result signal $F_i$ from the operation result output terminal 3.

When a logic operation "AND" is executed, "0, 1, 1" are inputted respectively as the control signals $S_2$, $S_1$, $S_0$ to the respective control signal lines 25, 26, 9.

In this case, on the assumption that the first EXOR gate 30 inverts and outputs the output of the first NAND gate 29, and the second EXOR gate 21 inverts and outputs the output of the second NAND gate 32, explanation will be given on the respective combinations of the first operand signals $A_i$ and the second operand signals $B_i$ inputted respectively to the first operand input terminal 1 and the second operand input terminal 2.

At first, explanation will be given on the case where "0" is inputted as the first operand signal $A_i$ to the first operand input terminal 1, and "0" is inputted as the second operand signal $B_i$ to tile second operand input terminal 2.

In this case, the OR gate 31 outputs "0". The second NAND gate 32 inputs the output of the OR gate 31 and outputs "1" to the second EXOR gate 21. The second EXOR gate 21 inverts the output of the second NAND gate 32 and outputs "0", and the output "0" is outputted as the operation result signal $F_i$ from the operation result output terminal 3.

Next, explanation will be given on the case where "1" is inputted as the first operand signal $A_i$ to the first operand input terminal 1 and "0" is inputted as the second operand signal $B_i$ to the second operand input terminal 2.

The first NAND gate 29 inputs "0" as the second operand signal $B_i$ from the second operand input terminal 2 and outputs "1". The first EXOR gate 30 inverts the output of the first NAND gate 29 to output "0". The second NAND gate 32 inputs the output of the first EXOR gate 30 and outputs "1" to the second EXOR gate 21. The second EXOR gate 21 inverts the output of the second NAND gate 32 and outputs "0", and this output "0" is outputted as the operation result signal $F_i$ from the operation result output terminal 3.

Explanation will be omitted on the case where "0" is inputted as the first operand signal $A_i$ to the first operand input terminal 1 and "1" is inputted as the second operand signal $B_i$ to the second operand input terminal 2, because the output of the first NAND gate 29 is the same as in the case abovementioned.

At last, explanation will be given on the case where "1" is inputted as the first operand signal $A_i$ to the first operand input terminal 1 and "1" is inputted as the second operand signal $B_i$ to the second operand input terminal 2.

In this case, since all of the three inputs of the first NAND gate 29 become "1", the first NAND gate 29 outputs "0". The first EXOR gate 30 inverts the output of the first NAND gate 29 and outputs "1". On the other hand, since both of the inputs of the OR gate 31 are "1", the OR gate 31 outputs "1". Thereby, both of the two inputs of the second NAND gate 32 become "1", and the second NAND gate 32 outputs "0" to the second EXOR gate 21. Since the second EXOR gate 21 inverts and outputs the output of the second NAND gate 32, "1" is outputted as the operation result signal $F_i$ from the operation result output terminal 3.

When an arithmetic operation "ADD" is executed, "1, 0, 1" are inputted respectively as the control signals $S_2$, $S_1$, $S_0$ to the control signal lines 25, 26, 9.

In this case, since the control signal $S_1$ inputted to the second control signal line 26 is "0", the first EXOR gate 30 outputs intact the output of the first NAND gate 29. Since the control signal $S_2$ inputted to the third control line 9 is "1", the third NAND gate 20 inverts the carry signal $CY_{i-1}$ inputted from the carry input terminal 27 given from the preceding bit and outputs the inverted signal to the second EXOR gate 21.

Accordingly, when the carry signal $CY_{i-1}$ given from the preceding bit is "1", the second EXOR gate 21 outputs intact the output of the second NAND gate 32 from the operation result output terminal 3 as the operation result signal $F_i$, and when the carry signal $CY_{i-1}$ from the preceding bit is "0", the EXOR gate 21 inverts the output of the second NAND gate 32 and outputs the inverted signal from the operation result output terminal 3.

On these assumptions, explanation will be given on the respective combinations of the first operand signals $A_i$ and the second operand signals $B_i$ inputted respectively to the first operand input terminal 1 and the second operand input terminal 2.

At first, "0" is inputted as the first operand signal $A_i$ to the first operand input terminal 1 and "0" is inputted as the second operand input terminal $B_i$ to the second operand input terminal 2.

In this case, the OR gate 31 outputs "0". The second NAND gate 32 inputs the output of the OR gate 31 and outputs "1" to the second EXOR gate 21.

Accordingly, when the carry signal $CY_{i-1}$ inputted to the carry input terminal 27 given from the preceding bit is "1", the second EXOR gate 21 outputs the output "1" of the second NAND gate 32 intact to the operation result output terminal 3 as the operation result signal $F_i$. And since the inverter 33 inverts the output of the second NAND gate 32 and outputs "0", the fourth NAND gate 34 inputs the output "0" of the inverter 33 and outputs "1" to the fifth NAND gate 35. Further, since the output of the first NAND gate 29 which is the other input of the fifth NAND gate 35 is "1", the fifth NAND gate 35 outputs "0" as the carry signal $CY_i$ given to the following bit from the carry output terminal 28.

At this time, on the contrary, when the carry signal $CY_{i-1}$ inputted from the carry input terminal 27 from the preceding bit is "0", the second EXOR gate 21 inverts the output of the second NAND gate 32 and outputs "0" from the operation result output terminal 3 as the output operation result signal $F_i$. And since the inverter 33 inverts the output of the second NAND gate 32 and outputs "0", the fourth NAND gate 34 inputs the output of the inverter 33 and outputs "1" to the fifth NAND gate 35. Further, since the output of the first NAND gate 29 which is the other input of the fifth NAND gate 35 is "1", the fifth NAND gate 35 outputs "0" from the carry output terminal 28 as the carry signal $CY_i$ given to the following bit.

Next, explanation will be given on the case where "1" is inputted as the first operand signal $A_i$ to the first operand input terminal 1 and "0" is inputted as the second operand signal $B_i$ to the second operand input terminal 2.

In this case, the OR gate 31 outputs "1". The first NAND gate 29 inputs "0" as the second operand signal $B_i$ from the second operand input terminal 2 and outputs "1", and the first EXOR gate 30 outputs the "1" intact. Accordingly, both of the two inputs of the second NAND gate 32 become "1", and the second NAND gate 32 outputs "0".

At this time, therefore, when the carry signal $CY_{i-1}$ inputted from the carry input terminal 27 from the preceding bit is "1", the second EXOR gate 21 outputs intact the output "0" of the second NAND gate 32 from the operation result output terminal 3 as the operation result signal $F_i$. Since the inverter 33 inverts the output of the second NAND gate 32 and outputs "1", both of the two inputs of the fourth NAND gate 34 become "1", and the fourth NAND gate 34 outputs "0". The fifth NAND gate 35 inputs the output of the fourth NAND gate 34 and outputs "1" from the carry output terminal 28 as the carry signal $CY_i$ given to the following bit.

At this time, on the contrary, when the carry signal $CY_{i-1}$ inputted from the carry input terminal 27 from the preceding bit is "0", the second EXOR gate 21 inverts the output of the second NAND gate 32 and outputs "1" from the operation result output terminal 3. And the fourth NAND gate 34 inputs "0" as the carry signal $CY_{i-1}$ from the carry input terminal 27 and outputs "1" to the fifth NAND gate 35. Further, since the output of the first NAND gate 29 which is inputted to the fifth NAND gate 35 is "1", the fifth NAND gate 35 outputs "0" from the carry output terminal 28 as the carry signal $CY_i$ given to the following bit.

Explanation will be omitted on the case where "0" is inputted as the first operand signal $A_i$ to the first operand input terminal 1 and "1" is inputted as the second operand signal $B_i$ to the second operand input terminal 2, because the outputs of the first NAND gate 29 and the OR gate 31 are the same as aforementioned.

At last, explanation will be given on the case where "1" is inputted as the first operand signal $A_i$ to the first operand input terminal 1 and "1" is inputted as the second operand signal $B_i$ to the second operand input terminal 2.

In this case, all of the three inputs of the first. NAND gate 29 is "1", the first NAND gate 29 outputs "0", and the first EXOR gate 30 outputs intact the output of the first NAND gate 29. The second NAND gate 32 inputs the output of the first EXOR gate 30 and outputs "1".

Accordingly, when the carry signal $CY_{i-1}$ inputted to the carry input terminal 27 from the preceding bit is "1", the second EXOR gate 21 outputs intact the output "1" of the second NAND gate 32 from the operation result output terminal 3 as the operation result signal $F_i$. And since the first NAND gate 29 outputs "0", the fifth NAND gate 35 inputs the output of the first NAND gate 29 and outputs "1" from the carry output terminal 28 as the carry signal $CY_i$ given to the following bit.

At this time, on the contrary, when the carry signal $CY_{i-1}$ inputted from the carry input terminal 27 from the preceding bit is "0", the second EXOR gate 21 inverts the output of the second NAND gate 32 and outputs "0" from the operation result output terminal 3. And since the first NAND gate 29 outputs "0", the fifth NAND gate 35 inputs the output of the first NAND gate 29 and outputs "1" from the carry output terminal 28 as the carry signal $CY_i$ given to the following bit.

Since the ALU of the present invention shown in FIG. 3 can be composed of 38 transistors in total, the necessary number of transistors is reduced more than 10% in comparison with the conventional example, thereby it becomes possible to make the substrate area to be occupied is made smaller when a plurality of them are integrated as an LSI on a chip.

Figure 6:
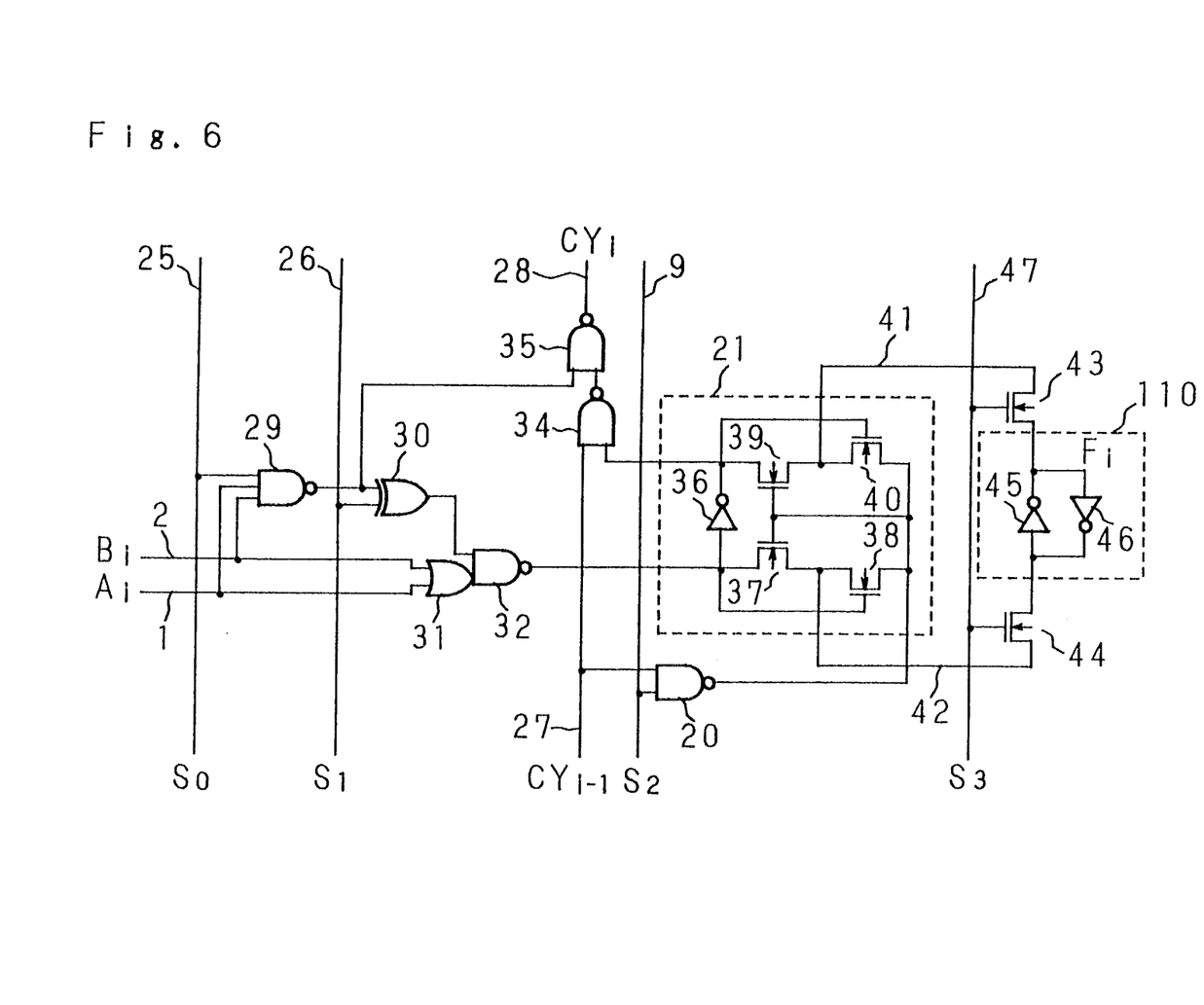
FIG. 6 is a circuit diagram of a circuit for one bit showing a configuration of a second embodiment of an arithmetic and logic unit of the invention.

FIG. 6 is a circuit diagram of a circuit for one bit showing a configuration of the second embodiment of the arithmetic and logic unit (ALU) of the present invention. In addition, it is also possible to constitute an ALU for a plurality bits by connecting a plurality of units shown in FIG. 6 in the same way as in the embodiment aforementioned.

The second embodiment is configured so that the second EXOR gate designated in the aforementioned embodiment by the reference numeral 21 is capable of generating both an EXOR output and an exclusive NOR (EXNOR) output, and is further provided with a temporary storing circuit 110 as means for temporarily storing these two outputs.

In addition, explanation on the components common to those in the embodiment shown in FIG. 3 will be omitted by giving them the same reference symbols.

In FIG. 6, reference numeral 36 designates an inverter and numerals 37 to 40 designate N channel transistors respectively, and the second EXOR gate 21 is configured by them all.

The input of the inverter 36, one main electrode of the N channel transistor 37 and a gate electrode of the N channel transistor 38 are connected to the output of the NAND gate 32. And one main electrode of the N channel transistor 39 and the gate electrode of the N channel transistor 40 are connected to the output of the inverter 36. Further, one main electrode of the N channel transistor 38, one main electrode of the N channel transistor 40, the gate electrode of the N channel transistor 37 and the gate electrode of the N channel transistor 39 are connected to the output of the NAND gate 20.

And the other main electrode of the N channel transistor 39 and the other main electrode of the N channel transistor 40 are connected to each other, thereby making the EXOR output terminal 41 of the second EXOR gate 21. Further, the other main electrode of the N channel transistor 37 and the other main electrode of the N channel transistor 38 are connected to each other, thereby making the EXNOR output terminal 42 of the second EXOR gate 21.

Reference numerals 43, 44 designate N channel transistors, and numerals 45, 46 designate inverters (not gates) each of whose inputs is connected to the other's output, respectively. One main electrode of the N channel transistor 43 is connected to the EXOR output terminal 41 of the second EXOR gate 21, and the other main electrode thereof is connected to the input of the inverter 46. One main electrode of the N channel transistor 44 is connected to tile EXNOR output terminal 42 of the second EXOR gate 21, and the other main electrode thereof is connected to the input of the inverter 45.

Numeral 47 designates a fourth control signal line, and the line 47 is connected to the gate electrode of the N channel transistor 43 and to the gate electrode of the N channel transistor 44.

And in this second embodiment, the inverter 33 provided in the aforementioned first embodiment is not provided, and instead of the output of the inverter 33, the output of the inverter 36 is connected to the input of the NAND gate 34.

The respective arithmetic/logic operations at the time of executing thereof in this second embodiment are same as those in the first embodiment, and the respective operation results are outputted to the EXOR output terminal 41 of the second EXOR gate 21, and the inverted signals thereof are outputted to the EXNOR output terminal 42. These outputs are stored in the temporary storing circuit 110 being as means for storing data and composed of the inverters 45, 46, when the signal of the fourth control signal line 47 becomes "1". And it is a matter of course that the operation result is obtained as the output of the inverter 45.

In addition, in this second embodiment, a data bus for taking out data from the ALU of the invention and the complimentary bus thereof are connected respectively to the outputs of the inverters 46, 45, thereby it is possible to drive by them, leading to reducing another inverter in comparison with the embodiment shown in FIG. 3.

As aforementioned, according to the arithmetic and logic unit related to the invention, it becomes possible to reduce the necessary number of transistors more than 10% per one bit in comparison with the conventional one, and since the arithmetic and logic unit itself is provided with a temporary storing means for storing operation result capable of driving data bus, it is not necessary to provide a driver separately, and further, the number of control signal lines for giving instruction for operation from the outside can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An arithmetic and logic unit executing arithmetic operation and logic operation between a first operand and a second operand which are both one bit, according to a carry input of a carry signal, and first, second and third externally applied control signals which designate a type of arithmetic and logic operation, comprising:

first NAND logic operating means for operating a NAND logic operation between the first operand, the second operand and the first externally applied control signal, and for outputting a result of the NAND logic operation;

first EXOR logic operating means for operating an exclusive OR logic operation between the result of said first NAND logic operating means and the second externally applied control signal, and for outputting a result of the exclusive OR logic operation;

OR logic operating means for operating an OR logic operation between the first operand and the second operand, and for outputting a result of the OR logic operation;

second NAND logic operating means for operating a NAND logic operation between the result of said first EXOR logic operating means and the result of said OR logic operating means, and for outputting a result of the NAND logic operation;

third NAND logic operating means for operating a NAND logic operation between the third externally applied control signal and the carry input of the carry signal, and for outputting a result of the NAND logic operation; and second EXOR logic operating means for operating an exclusive OR logic operation between the result of said second NAND logic operating means and the result of said third NAND logic operating means, and for outputting a result of the exclusive OR logic operation.

2. The arithmetic and logic unit as set forth in claim 1 is a CMOS static arithmetic and logic unit in which
said first NAND logic operating means is composed of a NAND gate,
said first EXOR logic operating means is composed of an EXOR gate,
said OR logic operating means is composed of an OR gate,
said second NAND logic operating means is composed of a NAND gate,
said third NAND logic operating means is composed of a NAND gate, and
said second EXOR logic operating means is composed of an EXOR gate, respectively.

3. The arithmetic and logic unit as set forth in claim 1, further comprising:
temporary storing means being composed of two NOT logic means each receiving an output of the other NOT logic means as an input for temporarily storing the output of said second EXOR logic operating means.

4. The arithmetic and logic unit as set forth in claim 3, wherein
   said second EXOR logic operating means has an EXOR logic output and an EXNOR logic output, and
   the respective outputs of said second EXOR logic operating means are connected respectively to the respective inputs of said two NOT logic means through respective N channel transistors.

5. An arithmetic and logic unit executing arithmetic operation and logic operation between a first operand and a second operand which are both one bit, according to a carry input of a carry signal, and first, second and third externally applied control signals which designate a type of arithmetic and logic operation, comprising:
   first NAND logic operating means for operating a NAND logic operation between the first operand, the second operand and the first externally applied control signal, and for outputting a result of the NAND logic operation;
   first EXOR logic operating means for operating an exclusive OR logic operation between the result of said first NAND logic operating means and the second externally applied control signal, and for outputting a result of the exclusive OR logic operation;
   OR logic operating means for operating an OR logic operation between the first operand and the second operand, and for outputting a result of the OR logic operation;
   second NAND logic operating means for operating a NAND logic operation between the result of said first EXOR logic operating means and the result of said OR logic operating means, and for outputting a result of the NAND logic operation;
   third NAND logic operating means for operating a NAND logic operation between the third externally applied control signal and the carry input of the carry signal, and for outputting a result of the NAND logic operating; and
   second EXOR logic operating means for operating an exclusive OR logic operation between the result of said second NAND logic operating means and the result of said third NAND logic operating means, and for outputting a result of the exclusive OR logic operation,
   whereby the result of the OR logic operation between said first operand and said second operand is outputted from said second EXOR logic operating means, by inputting "0, 0, 0" respectively as said first, second and third externally applied control signals,
   a result of an EXOR logic operation between said first operand and said second operand is outputted from said second EXOR logic operating means, by inputting "0, 0, 1" respectively as said first, second and third externally applied control signals,
   a result of an AND logic operation between said first operand and said second operand are outputted from said second EXOR logic operating means, by inputting "0, 1, 1" respectively as said first, second and third externally applied control signals, and
   a result of an ADD arithmetic operation between said first operand and said second operand is outputted from said second EXOR logic operating means, by inputting "1, 0, 1" respectively as said first, second and third externally applied control signals.

6. The arithmetic and logic unit as set forth in claim 5 is a CMOS static arithmetic and logic unit in which
   said first NAND logic operating means is composed of a NAND gate,
   said first EXOR logic operating means is composed of an EXOR gate,
   said OR logic operating means is composed of an OR gate,
   said second NAND logic operating means is composed of a NAND gate,
   said third NAND logic operating means is composed of a NAND gate, and
   said second EXOR logic operating means is composed of an EXOR gate, respectively.

7. The arithmetic and logic unit as set forth in claim 5, further comprising:
   temporary storing means being composed of two NOT logic means each receiving an output of the other NOT logic means as an input for temporarily storing the output of said second EXOR logic operating means.

8. The arithmetic and logic unit as set forth in claim 7, wherein
   said second EXOR logic operating means has an EXOR logic output and an EXNOR logic output, and
   the respective outputs of said second EXOR logic operating means are connected respectively to the respective inputs of said two NOT logic means through respective N channel transistors respectively.

9. An arithmetic and logic unit executing arithmetic operation and logic operation between a first operand and a second operand which are both one bit, according to a carry input of a carry signal, and first, second and third externally applied control signals which designate a type of arithmetic and logic operation, comprising:
   first NAND logic operating means for operating a NAND logic operation between the first operand, the second operand and the first externally applied control signal, and for outputting a result of the NAND logic operation;
   first EXOR logic operating means for operating an exclusive OR logic operation between the result of said first NAND logic operating means and the second externally applied control signal, and for outputting a result of the exclusive OR logic operation;
   OR logic operating means for operating an OR logic operation between the first operand and the second operand, and for outputting a result of the OR logic operation;
   second NAND logic operating means for operating a NAND logic operation between the result of said first EXOR logic operating means and the result of said OR logic operating means, and for outputting a result of the NAND logic operation;
   third NAND logic operating means for operating a NAND logic operation between the third externally applied control signal and the carry input of the carry signal, and for outputting a result of the NAND logic operation;
   second EXOR logic operating means for operating an exclusive OR logic operation between the result of said second NAND logic operating means and the result of said third NAND logic operating means, and for outputting a result of the exclusive OR logic operation, and carry generating means for generating a carry output from the result of said first NAND logic operating means, the result of said second NAND logic operating means and the carry input of the carry signal.

10. The arithmetic and logic unit as set forth in claim 9 is a CMOS static arithmetic and logic unit in which
said first NAND logic operating means is composed of a NAND gate,
said first EXOR logic operating means is composed of an EXOR gate,
said OR logic operating means is composed of an OR gate,
said second NAND logic operating means is composed of a NAND gate,
said third NAND logic operating means is composed of a NAND gate,
said second EXOR logic operating means is composed of an EXOR gate, and
said carry generating means is composed of a NOT gate receiving the result of said second NAND logic operating means, a first NAND gate receiving an output of said NOT gate and the carry input of the carry signal, and a second NAND gate receiving an output of said first NAND gate and the result of said first NAND logic operating means and outputting the carry output of the carry signal.

11. The arithmetic and logic unit as set forth in claim 9, further comprising:
temporary storing means being composed of two NOT logic means each receiving an output of the other NOT logic means as an input for temporarily storing the output of said second EXOR logic operating means.

12. The arithmetic and logic unit as set forth in claim 11, wherein
said second EXOR logic operating means has an EXOR logic output and an EXNOR logic output, and
the respective outputs of said second EXOR logic operating means are connected respectively to the respective inputs of said two NOT logic means through respective N channel transistors.

13. An arithmetic and logic unit executing arithmetic operation and logic operation between a first operand and a second operand which are both one bit, according to a carry input of a carry signal, and first, second and third externally applied control signals which designate a type of arithmetic and logic operation, comprising:
first NAND logic operating means for operating a NAND logic operation between the first operand, the second operand and the first externally applied control signal, and for outputting a result of the NAND logic operation;
first EXOR logic operating means for operating an exclusive OR logic operation between the result of said first NAND logic operating means and the second externally applied control signal, and for outputting a result of the exclusive OR logic operation;
OR logic operating means for operating an OR logic operation between the first operand and the second operand, and for outputting a result of the OR logic operation;
second NAND logic operating means for operating a NAND logic operation between the result of said first EXOR logic operating means and the result of said OR logic operating means, and for outputting a result of the NAND logic operation;
third NAND logic operating means for operating a NAND logic operation between the third externally applied control signal and the carry input of the carry signal, and for outputting a result of the NAND logic operation
second EXOR logic operating means for operating an exclusive OR logic operation between the result of said second NAND logic operating means and the result of said third NAND logic operating means, and for outputting a result of the exclusive OR logic operation, and
carry generating means for generating a carry output from the result of said first NAND logic operating means, the result of said second NAND logic operating means and the carry input of the carry signal,
whereby the result of the OR logic operation between said first operand and said second operand is outputted from said second EXOR logic operating means, by inputting "0, 0, 0" respectively as said first, second and third externally applied control signals,
a result of an EXOR logic operation between said first operand and said second operand is outputted from said second EXOR logic operating means, by inputting "0, 0, 1" respectively as said first, second and third externally applied control signals,
a result of an AND logic operation between said first operand and said second operand is outputted from said second EXOR logic operating means, by inputting "0, 1, 1" respectively as said first, second and third externally applied control signals, and
a result of an ADD arithmetic operation between said first operand and said second operand is outputted from said second EXOR logic operating means, by inputting "1, 0, 1" respectively as said first, second and third externally applied control signals.

14. The arithmetic and logic unit as set forth in claim 13 is a CMOS static arithmetic and logic unit in which
said first NAND logic operating means is composed of a NAND gate,
said first EXOR logic operating means is composed of an EXOR gate,
said OR logic operating means is composed of an OR gate,
said second NAND logic operating means is composed of a NAND gate,
said third NAND logic operating means is composed of a NAND gate,
said second EXOR logic operating means is composed of an EXOR gate, and
said carry generating means is composed of a NOT gate receiving the result of said second NAND logic operating means, a first NAND gate receiving an output of said NOT gate and the carry input of the carry signal, and a second NAND gate receiving an output of said first NAND gate and the result of said first NAND logic operating means and outputting the carry output of the carry signal.

15. The arithmetic and logic unit as set forth in claim 13, further comprising:
temporary storing means being composed of two NOT logic means each of the other NOT logic means as an input for temporarily storing the output of said second EXOR logic operating means.

16. The arithmetic and logic unit as set forth in claim 15, wherein
said second EXOR logic operating means has an EXOR logic output and an EXNOR logic output, and
the respective outputs of said second EXOR logic operating means are connected respectively to the respective inputs of said two NOT logic means through respective N channel transistors respectively.

* * * * *